May 8, 1951  W. I. TINDALL  2,552,073
AUXILIARY CONTROL MEANS FOR AIRCRAFT
Filed Feb. 14, 1947  2 Sheets-Sheet 1
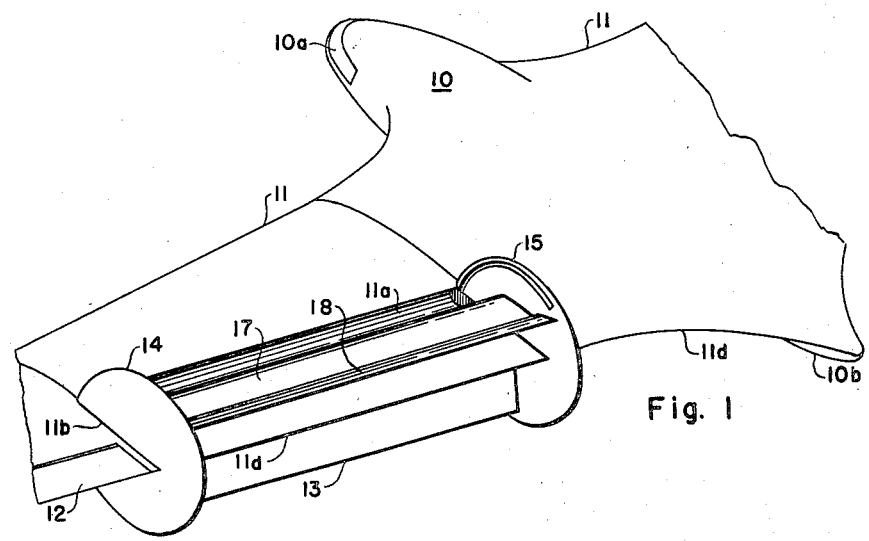
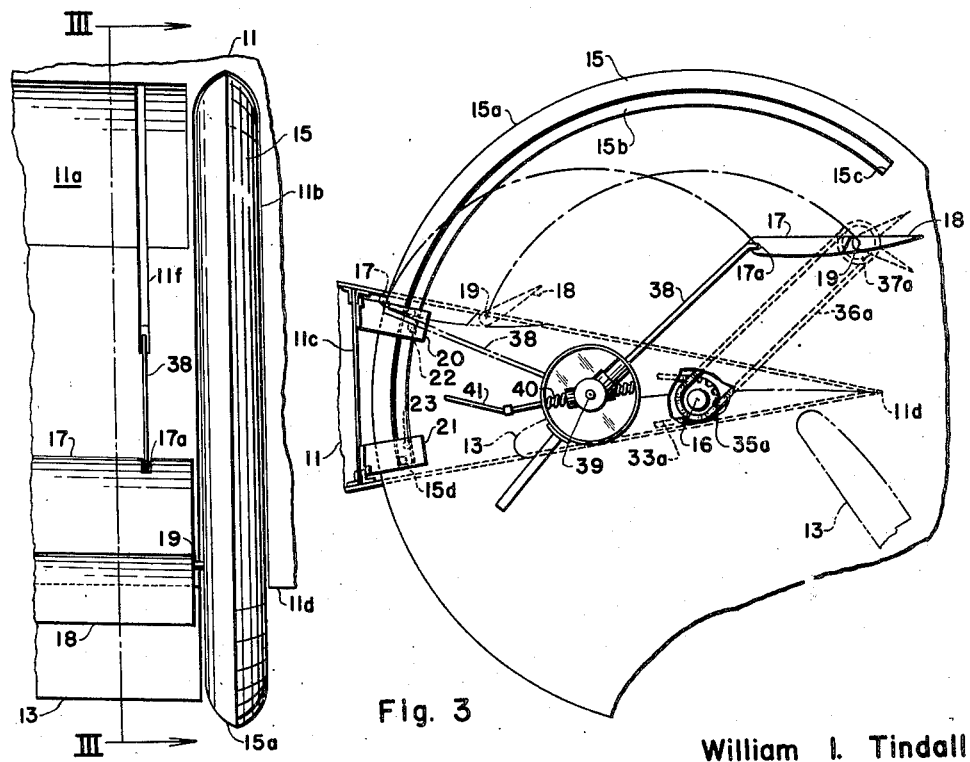
Fig. 1
Fig. 2
Fig. 3
William I. Tindall
INVENTOR.
BY  James M. Clarke
HIS  PATENT  ATTORNEY May 8, 1951 W. I. TINDALL 2,552,073
AUXILIARY CONTROL MEANS FOR AIRCRAFT
Filed Feb. 14, 1947 2 Sheets-Sheet 2

William I. Tindall
INVENTOR.

BY
HIS PATENT ATTORNEY

Patented May 8, 1951

2,552,073

UNITED STATES PATENT OFFICE 2,552,073

AUXILIARY CONTROL MEANS FOR AIRCRAFT

William I. Tindall, La Mesa, Calif., assignor to Consolidated Vultee Aircraft Corporation, a corporation of Delaware Application February 14, 1947, Serial No. 728,592

16 Claims. (Cl. 244—42)

The present invention relates generally to aircraft control and more particularly to control surfaces adapted for both the longitudinal and lateral control of aircraft and like vehicles.

In view of the decided aerodynamic advantages of high lift flaps for take-off and landing purposes, their use is now quite general, particularly in the operation of medium and large aircraft. Certain types of these flaps, however, cause a relatively large rearward shift in the center of lift of the wing when the flap is extended rearwardly, which accordingly presents a problem in counter-acting the pitching moment which results when these flaps are placed into use. This disturbance to the location of the center of lift in conventional type aircraft having rearwardly disposed horizontal tail surfaces is readily compensated for by producing a negative lift, or downward force, by corrective movement of the elevator surfaces.

In such conventional empennage type aircraft, these flaps usually produce a down-wash effect which, as it strikes the stabilizer surfaces, also tends to counter-balance the diving moment and thereby produces a more stable longitudinal condition. The necessity for this negative lift in the tail surfaces, however, regardless of how it is developed, adds to the load or the lift which is required to be developed by the main sustaining surfaces. To this extent it has been found objectionable and has detracted from the aerodynamic efficiency and loading characteristics of the airplane. Numerous attempts have been made in the past to overcome these disadvantages by the provision of auxiliary lifting surfaces located forwardly with respect to the center of gravity of the airplane, or the center of pressure of the main sustaining surface, in order that this auxiliary lift might assist the lift of the main sustaining surface, rather than to unnecessarily add to its load.

In tail-less, or flying-wing, types of aircraft, however, the use of certain type flaps has presented problems for which solutions cannot be so readily made due to their lack of rearwardly disposed elevator surfaces. The present invention accordingly is directed more particularly to the provision of a novel circular fin and associated balance or control surface for counter-acting the diving moments produced in both empennage and tail-less type aircraft upon rearward extension of the high lift wing flaps. These circular disc or fin surfaces are preferably vertically disposed and may either be fixed with respect to the wing structure or may be rotated with respect thereto as the auxiliary surfaces are extended into operative position. These auxiliary surfaces are such that they may be extended upwardly and rearwardly with respect to the trailing edge of the wing from a retracted position within the upper surface thereof and are adapted to be efficiently supported in their upwardly and rearwardly extended positions by the adjacent vertical fins. These fin or disc surfaces contribute materially to the directional stability of the airplane particularly when it is of the tail-less or flying-wing type, and being disposed at the ends of the landing flaps and auxiliary balance surfaces serve as efficient tip shields for the latter thereby contributing materially to their effectiveness.

It is, accordingly, a major object of the present invention to provide a control system which includes auxiliary balance surfaces which eliminate the bucking or nose-heaviness of an aircraft when the flaps are placed into use. A corollary objective is the provision of an auxiliary control surface disposed between a pair of vertical disc or fin surfaces for use in a tail-less type aircraft. It is a further object to provide an auxiliary balance surface which is completely faired into the upper surface of the wing when not in use and which, when extended rearwardly and upwardly together with the flap extension, serves as an elevator means to counteract diving tendencies caused by the extension of the flaps. It is a still further object to provide such an auxiliary elevator surface with means for controlling its angle of attack as well as to provide such surfaces with movable trailing portions.

It is, accordingly, a further object of the present invention to provide a control surface which may be utilized as a combined aileron and elevator during the take-off and landing of tail-less aircraft. A still further object of this invention resides in provision for the lateral control of a tail-less aircraft in flight by the utilization of the said trailing control surfaces, in their retracted positions as a spoiler means to augment whatever aileron control might be provided. A further object resides in the provision of such a control surface which clears the lower surface of the trailing edge of structural complications and permits the use of full span flaps and similar controls, which would be interrupted only by the vertical fins. A still further object of the invention is the provision of a control surface which is capable of cooperating with the flaps of a tail-less aircraft in such manner that it automatically counter-balances any pitching moments which may be generated when the flaps are extended.

Other objects and advantages of the present invention will become apparent to those skilled in the art after reading the present description taken in conjunction with the accompanying drawings forming a part hereof in which:

Fig. 1 is a perspective view of the wing of a tail-less airplane to which the present invention has been applied;

Fig. 2 is a plan view of the inner ends of the control surfaces and the inner fin shown in Fig. 1;

Fig. 3 is a cross sectional view taken along the lines III—III of Fig. 2 looking toward the fuselage;

Figure 6:
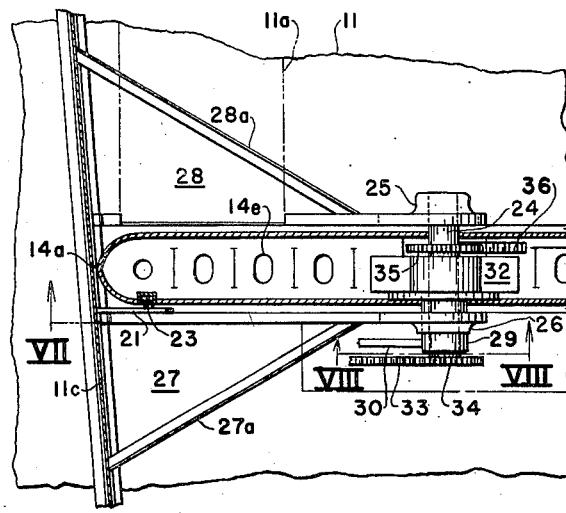
Fig. 6 is a sectional plan view of a fin and the adjacent wing structure.

Referring now to Fig. 1, there is fragmentarily shown a perspective view of an all-wing or tail-less type aircraft having a central fuselage or body 10 with a nose or cockpit control portion 10a and a fuselage trailing portion 10b. Extending transversely in the usual manner to either side of the fuselage 10, are the main sustaining surfaces or wings 11 having a trailing edge 11d which has been shown as sweeping back rearwardly to meet the trailing portion of the fuselage at 10b. While the invention has been shown and described as applied to a tail-less type airplane, it will be understood that it is also capable of use with conventional aircraft having empennages or tails.

The outer portion of each wing is preferably provided with an aileron 12 of the usual type and an inner section of each wing is provided with a high lift flap 13. Vertical discs or fins 14 and 15 of circular plan-form are disposed at each end of the flap 13, being mounted for rotation upon transverse axes within the trailing portion of each wing. In the modification which has been selected for illustrative purposes, the trailing edge 11d of the wing has been shown as tapering, or being swept forward toward the wing tips. For this reason it will be obvious that, while the vertical fins 14 and 15 lie in parallel vertical planes, the fin 15 lies somewhat more rearwardly of the fin 14 and the central axis of its pivot 16 projected outwardly would strike the plane of the outer fin 14 somewhat rearwardly of its central axis. Accordingly, while the flap 13 is preferably supported and operated from the wing structure, its ends are not at right angles to its leading and trailing edges, but these ends are cut off at an angle, as shown in Fig. 2, to move relatively closely to the inner faces of the discs as the flap is operated.

Figure 4:
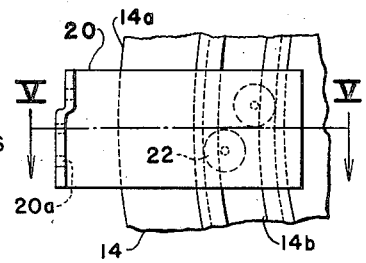
Fig. 4 is a detail view of one of the fin guides shown in Fig. 3.
Figure 5:
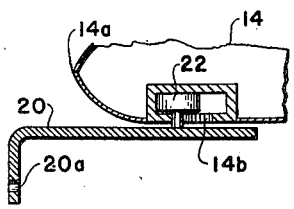
Fig. 5 is a sectional plan view of this guide as taken along the lines V—V of Fig. 4.

A balance surface 17 having a movable trailing portion 18 is pivotally mounted at 19 upon the fins 14 and 15 in such manner that as the fins are rotated in the clockwise direction, as viewed in Figs. 1 and 3, the surfaces 17—18 are moved from a recess 11a in the upper surface of the wing 11 to their upward and rearward operative position shown in these figures. As in the case of the flap 13 the ends of the surfaces 17—18 are also cut off at an angle, as indicated in Fig. 2, such that they move between their retracted and extended positions with a uniform clearance between their ends and the inner surfaces of the fins 14 and 15. Referring now to Figs. 2 and 3, the fin 15 is mounted for rotation upon the pivot 16 which is supported from the wing structure. The periphery 15a of the fin is disposed slightly rearwardly of the rear spar 11c and the wing is provided with a cutout portion 11b within which the fin is adapted to rotate with a minimum clearance. Attached to, and extending rearwardly from the rear spar 11c are the brackets 20 and 21, the upper bracket 20 of which is shown to an enlarged scale in Figs. 4 and 5. This bracket has an apertured flange portion 20a through which it is attached to the web of the spar 11c and the rearwardly extending portions of each bracket 20 and 21 has pivotally mounted thereon the staggered guide rollers 22 and 23 respectively, which extend into the slotted guide tracks 14b and 15b of the fins 14 and 15, respectively. These guide slots 14b and 15b are provided with properly placed terminal stops or ends, such as 15c and 15d of the fin 15 shown in Fig. 3, which strike against the rollers 22 or 23 to determine the extreme position of the fin at which the surfaces 17—18 are either retracted or fully extended.

Figure 7:
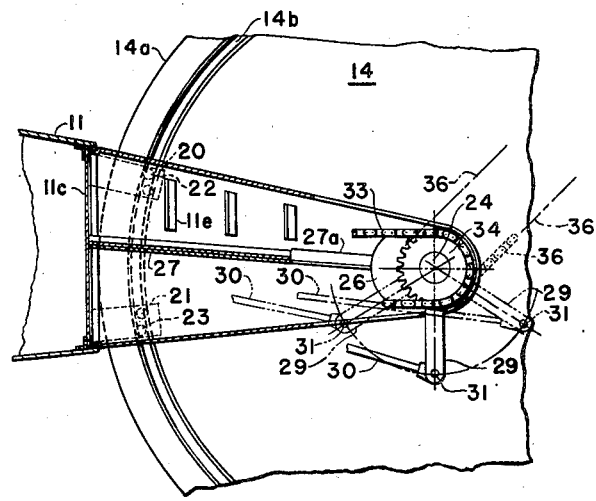
Fig. 7 is a sectional elevational view of the same fin and structure as taken along the lines VII—VII of Fig. 6.
Figure 8:
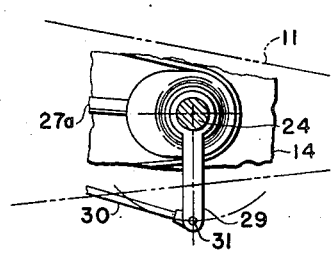
Fig. 8 is a similar sectional view of the control mechanism at the fin pivot.

As may be seen in Figs. 6 and 7, the pivot shaft 24 for the fin 14 is journaled within the flange pivot hub fittings 25 and 26 which are rigidly fastened to the structure of the wing 11. The flange portions of these fittings extend forwardly and are stiffened and braced from the spar 11c by means of the triangular shaped horizontal brackets comprising the web portions 27 and 28 and the flanges 27a and 28a, respectively. Mounted for rotation upon the pivot shaft 24 and rigidly interconnected with the fin structure 14 is the bell crank member 29 which is attached to the push rod 30 by the pivot 31. The member 29 extends through the bore of the hub fitting 26 and has rigidly attached thereto the lugs or ears 32 which are fixedly attached to the internal structure of the fin 14. Suitably keyed to the extending portion of the shaft 24 is a sprocket 34 engaged by the chain 33 which extends forwardly into the wing structure for operative control by the pilot. There is also keyed to the inner portion of the shaft 24 a sprocket 35 which is adapted to operate, through a chain, such as 36a in Fig. 3, and 36 in Fig. 7, a sprocket 37a (Fig. 3) mounted upon the pivot 19 for control of the trailing edge surface 18 of the combined aileron-elevator 17. Similar counterparts of each drive are preferably disposed within each of the fins 14 and 15, there being a like drive chain 33a engaging a similar sprocket on the pivot shaft 16 in the fin 15, and a like sprocket 35a driving the chain 36a, as previously described. Returning again to Figs. 6 and 7 with respect to the outer fin 14, it will be noted that the previously referred to bell crank member 29 has an arm portion fixedly attached thereto as shown in Fig. 8 and is pivotally connected to the push-pull rod 30 at the pivotal connection 31. It will accordingly be noted that as the forwardly extended push-pull rod 30 is extended rearwardly, through the full line vertical position shown in Figs. 7 and 8, to its rearward dotted position, the disc or fin 14 will have been rotated from the extended position of the surfaces 17—18 to the retracted position in which these surfaces are faired into the upper surface cavity 11a of the wing 11.

Similarly it will be noted that as the chain sections 33 and 33a are moved under the pilot's control, the corresponding pairs of sprockets 34—34a and 35—35a will cause the respective chain strands 36 and 36a to impart corresponding rotation to the trailing edge control surface 18, as by the sprocket 37a. Referring to Figs. 2 and 3, it will be noted that the leading edge of the surface 17 is provided with a pivotal connection at 17a to an arm 38 which is pivotally connected at 39 to an operating lead screw 40. The lead screw 40 is provided with a nut member 39 which serves as the pivotal connection adapted to receive the lower terminal of the link or radius rod 38. The lead screw 40 is connected through conventional universal joints to a rotating control rod 41 which extends forwardly to a suitable pilot control means. It will accordingly be noted that as the shaft or rod 41 is rotated, imparting corresponding rotation to the lead screw 40, the nut member 39 in being translated along the axis of the lead screw 40 imparts either upward or downward movement to the radius rod 38 and corresponding change in angle of attack of the aileron-elevator surface 17.

Normally the position of the pivot nut member 39 is such that as the fins are rotated, and the surfaces 17—18 projected, the chord of this combined auxiliary surface will be parallel to that of the main airfoil. This combined auxiliary surface forms an airfoil section which is inverted or opposite to that of the normal lifting airfoil inasmuch as this auxiliary surface is intended to normally provide a negative lift. Since the lower terminal of the radius rod 38 is adapted to rotate about its pivotal connection at 39, the upper surface of the wing 11 is suitably recessed at 11f as shown in Fig. 2 to permit retraction of the radius rod into the retracted position shown in Fig. 3 as the auxiliary surface 17—18 is housed and faired within the upper surface of the wing 11. In the latter position the trailing portion 18 of the auxiliary surface is adapted to be rotated into its dotted position by suitable operation of the chains 33 and 33a to serve as a spoiler and to augment the aileron action. The mechanism 29—30—31 and 32 for rotating the fins is preferably interconnected with the actuating mechanism for extending and retracting the flap 13 such that as the flap is extended the auxiliary surfaces 17—18 are correspondingly extended at the proper angle of attack to balance the nose-down moment created by the flap 13.

It is also contemplated that two or more pairs of circular fins, bearing between them longitudinal auxiliary control surfaces, might be installed in certain airplanes. In such arrangements the inner pair on each wing would be set and designed to co-act with the flaps for automatically eliminating any pitching or bucking tendencies which might be developed. The outer pair would be used to support a combination aileron-elevator of the type shown for both landing and take-off. These arrangements are particularly advantageous in tail-less aircraft inasmuch as sufficient control is not normally available to give instant response at lower speeds. Once the aircraft were in the air, however, and flying at higher speds, the control problem would not be so critical and the surfaces could be retracted. Under such cruising and high speed flight conditions, it would be possible to maintain longitudinal control with small elevators or tabs.

Lateral control is achieved by operating the trailing control surface 18 of the retracted auxiliary surface, in the retracted position of the fin, in an upward direction as shown in Fig. 3 in which it creates a spoiler action upon whichever side of the airplane this action is required. There are also several advantages to be gained by the use of two pairs of longitudinal flaps as for example, the inner pair would be operated automatically in conjunction with the high lift flap in such a manner that there would be only slightly unbalanced forces to be overcome by the control surface operated by the pilot. In certain installations longitudinal flaps would preferably be supported by a vertical fin with one end of the inner flap supported on an extension arm similar to that which is utilized for operating the fin itself. Also if desirable, the vertical fins could be used to carry the auxiliary surfaces such as rudders or flaps on the underside of the wing. In the airplane shown in the drawings, the directional control means would preferably be in the form of wing tip rudders, but it will be understood that the present invention is adapted for use in aircraft having any suitable form of directional control means.

Other forms and modifications of the present invention, which may occur to those skilled in the art after reading the present description, are intended to come within the scope and spirit of this invention as more particularly set forth in the appended claims.

I claim:

1. In an aircraft having a wing, and a flap operatively associated with said wing subjecting the aircraft in its lift increasing position to a diving moment, means for counter-balancing said diving moment comprising a pair of vertical fins rotatively mounted upon said wing, said fins pivotally mounted to extend above and below said wing in all rotated positions, a control surface pivotally suported from said fins, and control means for adjusting said control surface both with respect to said wing and to said fins for counter-balancing the diving moment created by said flap operation.

2. In an aircraft having a wing, a flap arranged upon extension from said wing to increase the lift of said wing and impart a diving moment to the aircraft, means for counter-balancing said diving moment comprising a pair of vertical fins rotatively mounted upon said wing such that it occupies the same relative position with respect to said wing in all of its rotated positions, a control surface pivotally supported from said fins, and means for simultaneously rotating said fins and moving said control surface into an operative position arranged for the counter-balancing of the diving moment created by said flap extension.

3. In an aircraft, a wing, a rearwardly extendible flap operatively associated with said wing arranged upon extension to increase the lift of said wing and to impart a diving moment to the aircraft, a vertical fin rotatively mounted upon said wing in such manner that it extends both above and below said wing in all of the positions into which it is rotated, a control surface operatively carried upon an upper forward portion of said fin in which position said control surface is retracted within the upper surface of said wing and control means connected to said fin for rotating said fin upper forward portion rearwardly for the rearward and upward extension of said control surface to a position in which it is supported from fin above the trailing edge of said wing.

4. In an aircraft, a wing, a flap operatively associated with said wing, and means for counterbalancing center of pressure shift due to said flap actuation comprising a pair of laterally spaced circular vertical fins rotatively mounted upon said wing upon fixed axes in such manner that said fins extend both above and below said wings in each of their rotated positions, a control surface pivotally suported by and extending between said vertical fins and control means for partially rotating said fins for the concurrent extension and retraction of said control surface simultaneously with the extension and retraction of said high lift flaps.

5. In an aircraft, a wing, a flap operatively associated with said wing arranged upon extension to increase the lift of said wing and to cause a center of pressure shift in the wing lift, means for counter-balancing said center of pressure shift comprising a pair of circular vertical fins rotatively mounted upon said wing upon fixed axes such that said fins remain in a relatively fixed position with respect to said wing during their rotation, a control surface pivotally supported by said fins, a radius element pivotally interconnecting said wing and said control surface in such manner that upon rotation of said fins and rearward extension of said control surface said radius element imparts rotation to said control surface about its pivotal support upon said fins into a predetermined attitude substantially parallel with respect to said wing.

6. In an aircraft wing having a flap operatively associated therewith, means for counterbalancing center of pressure shift due to said flap actuation comprising a pair of vertical fins rotatively mounted upon a fixed axis in such manner that said fins maintain the same relative positions with respect to said wing during their rotation, a control surface pivotally supported by said fins on a pivot axis spaced from the axis of rotation of said fins, operating means for concurrently extending said flap and rotating said fins for the simultaneous rearward and upward movement of said control surface to an extended position spaced above the trailing portion of said wing and disposed in a substantially parallel relationship thereto, and control means for adjusting said control surface in said extended position.

7. In an aircraft wing having a high lift flap operatively associated with a trailing portion thereof, means for counterbalancing center of pressure shift due to said flap actuation comprising a pair of spanwise spaced vertical fins rotatively mounted upon said wing in such manner that said fins maintain the same relative positions with respect to said wing during rotation, a control surface pivotally supported by said fins on a pivot axis spaced from the axis of rotation of said fins, operating means for concurrently extending said flap and rotating said fins for the extension of said control surface and a radius element housed entirely within one of said fins pivotally interconnecting said wing and said control surface in such manner that upon rotation of said fin and rearward extension of said control surface, said radius element maintains said control surface in predetermined attitudes with respect to said wing.

8. In an aircraft wing having a high lift flap operatively associated therewith, means for counterbalancing center of pressure shift due to said flap actuation comprising a pair of vertical fins disposed at each end of said flap and rotatively mounted upon said wing, a control surface pivotally supported from and extending between said vertical fins, said control surface having an adjustable trailing portion, means for rotating said fin for the upward and rearward extension of said control surface, radius link means pivotally interconnecting said control surface and said wing for predetermined positioning of said control surface with respect to said wing in the said extended position, operating means housed within said fin for the adjustment of said trailing portion of said control surface and means for adjusting the length of said radius link means for adjusting the said relative position of said control surface with respect to said wing.

9. In an aircraft wing having a high lift flap operatively associated therewith, means for counter-balancing center of pressure shift due to said flap actuation comprising a pair of vertical fins rotatably mounted upon fixed axes in such manner that said fins maintain their relative positions with respect to said wing during rotation of said fins, a control surface pivotally supported by said fins, a recess in the upper surface of said wing arranged to receive said control surface in a retracted position in which the upper surface of said control surface is substantially flush with the upper surface of said wing, said control surface having an adjustable trailing portion, actuating means for rotating said fins in such manner that said control surface is projected upwardly and rearwardly from said retracted position with respect to said wing, and control means for adjusting the said trailing portion of said control surface in both its retracted and extended positions.

10. In an aircraft wing having a flap operatively associated with the trailing portion thereof, means for counter-balancing center of pressure shift due to said flap operation comprising a pair of spanwise spaced vertical fins mounted upon said wing, a control surface pivotally supported at its ends from said fins, a recess in the upper surface of said wing arranged to receive said control surface in its retracted position, said control surface having an adjustable trailing portion actuating means housed within said fins for projecting said control surface upwardly and rearwardly with respect to said wing, control means housed within said fins for adjusting the said trailing portion of said control surface upwardly in both its retracted and extended positions and further control means operatively associated with said control surface and extending through said fins for the adjustment of the angle of incidence of said control surface in its extended position with respect to said wing.

11. In an aircraft wing having a flap downwardly and rearwardly extendible from the lower surface thereof, means for counter-balancing the center of pressure shift due to said flap extension comprising an upwardly and rearwardly extendible auxiliary surface co-extensive with the spanwise dimension of said flap, and a pair of spanwise spaced fins mounted upon said wing such that they extend above and below said wing and provide end tip shields for said co-extensive flap and auxiliary surface.

12. In an aircraft wing having a flap operatively associated with the lower surface thereof, means for counter-balancing center of pressure shift due to said flap operation comprising a pair of laterally spaced fins pivotally mounted upon a fixed axis such that they maintain the same relative positions with respect to said wings, a balance surface pivotally supported by said fins on a pivot axis spaced from the axis of pivotation of said fins, operating means for rotating said fins for the extension of said balance surface into its operative position for the counter-balancing of the center of pressure shift caused by said flap actuation, mechanism associated with the leading edge of said balance surface for the adjustment of its angle of attack in its extended position, said balance surface having a pivoted trailing portion and mechanism for adjusting said trailing portion with respect to said balance surface.

13. An aircraft wing, a flap operatively associated with the lower surface of said wing, a pair of vertical fins rotatably mounted upon fixed axes housed within the trailing portion of said wing in such manner that said fins maintain the same relative positions with respect to said wing during rotation of said fins, a control surface disposed above said wing trailing portion pivotally supported by and extending between said fins, said flap and said control surface being substantially co-extensive in the spanwise direction such that said fins are abutted by said flap and control surface and form tip shields for said flap and said control surface in each of their retracted and extended positions, and actuating mechanism for simultaneously extending and retracting said flap and said control surface.

14. In an aircraft wing having a flap operatively associated with the trailing portion thereof, means for counter-balancing center of pressure shift due to said flap operation comprising a pair of vertical fins rotatably mounted upon said wing, a control surface pivotally supported by said fins and eccentrically disposed with respect to the axis of rotation of said fins, a recess in the upper surface of said wing arranged to receive said control surface in its retracted position, said control surface having an adjustable trailing portion, means for rotating said fins in such manner that said control surface is projected upwardly and rearwardly with respect to said wing while said fins maintain the same relative position with respect to said wing, means for adjusting the said trailing portion of said control surface upwardly in both its retracted and extended positions and further control means operatively associated with said control surface for the adjustment of the angle of incidence of said control surface in its extended position with respect to said wing for counter-balancing said center of pressure shift due to said flap operation.

15. In an aircraft wing having a flap extendible from the lower surface thereof, counter-balancing means for compensating for the center of pressure shift due to said flap extension comprising an auxiliary surface co-extension with the spanwise dimension of said flap extendible from the upper surface of said wing, a pair of spanwise spaced fins mounted upon said wing such that they extend above and below said wing and provide end tip shields for said co-extensive flap and auxiliary surface, and actuating means for simultaneously extending and retracting said flap and auxiliary surface.

16. In an aircraft wing having a flap extendible from the lower surface thereof, counter-balancing means for compensating for the center of pressure shift due to said flap extension comprising an auxiliary surface co-extensive with the spanwise dimension of said flap extendible from the upper surface of said wing, a pair of spanwise spaced fins mounted upon said wing such that they extend above and below said wing and provide end tip shields for said co-extensive flap and auxiliary surface, actuating means for simultaneously extending and retracting said flap and auxiliary surface, and mechanism extending from said wing through said fins to said auxiliary surface for controlling the angle of incidence of said auxiliary surface in its extended position.

WILLIAM I. TINDALL.

REFERENCES CITED

The following references are of record in the file of this patent:

UNITED STATES PATENTS

| Number | Name | Date |
| --- | --- | --- |
| 1,774,474 | Burnelli | Aug. 26, 1930 |
| 2,120,760 | Lumiere | June 14, 1938 |
| 2,218,822 | Joyce | Oct. 22, 1940 |
| 2,252,656 | Youngman | Aug. 12, 1941 |
| 2,271,763 | Fowler | Feb. 3, 1942 |
| 2,383,102 | Zap | Aug. 21, 1945 |